(12) United States Patent
Inoue et al.

(10) Patent No.: US 10,124,850 B2
(45) Date of Patent: Nov. 13, 2018

(54) FUEL TANK FOR STRADDLE TYPE VEHICLE

(71) Applicant: HONDA MOTOR CO., LTD., Tokyo (JP)

(72) Inventors: Yusuke Inoue, Wako (JP); Kohei Hirano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/065,392

(22) Filed: Mar. 9, 2016

(65) Prior Publication Data
US 2016/0280301 A1 Sep. 29, 2016

(30) Foreign Application Priority Data
Mar. 26, 2015 (JP) .................................. 2015-063798

(51) Int. Cl.
*B62J 35/00* (2006.01)
(52) U.S. Cl.
CPC ..................................... *B62J 35/00* (2013.01)
(58) Field of Classification Search
CPC ........................................................ B62J 35/00
See application file for complete search history.

(56) References Cited

U.S. PATENT DOCUMENTS

| 2003/0074965 A1* | 4/2003 | Okamoto | B62J 35/00 73/313 |
| 2009/0101220 A1* | 4/2009 | Mundy | B62J 35/00 137/575 |
| 2011/0233207 A1* | 9/2011 | Okawada | B60K 15/03 220/212 |
| 2011/0315254 A1* | 12/2011 | Koyama | F02M 37/10 137/565.01 |
| 2012/0025510 A1* | 2/2012 | Nishimura | B62J 35/00 280/835 |
| 2012/0074139 A1* | 3/2012 | Hisadomi | B60K 15/04 220/200 |
| 2013/0008899 A1* | 1/2013 | Hisadomi | B60K 15/03 220/86.2 |
| 2013/0105234 A1* | 5/2013 | Nishimura | B62J 35/00 180/69.4 |

(Continued)

FOREIGN PATENT DOCUMENTS

| EP | 1872996 A1 * | 1/2008 | .............. B62J 35/00 |
| EP | 2457814 A2 * | 5/2012 | .............. B62J 35/00 |

(Continued)

*Primary Examiner* — Jacob D Knutson
(74) *Attorney, Agent, or Firm* — Rankin, Hill & Clark LLP

(57) ABSTRACT

A fuel pump of a straddle type vehicle is provided to be arranged suitably within a fuel tank. The fuel tank of the straddle type vehicle includes a vertically split upper tank and lower tank that have flanges joined by welding. The flanges are arranged to extend along an upper part of left and right main frames, which are inclined so as to extend in a forward and rearward direction. A fuel pump is arranged in an interior of the fuel tank through an opening provided in the lower tank. A pump flange section is provided in the fuel pump so as to close the opening. The lower tank is provided with a substantially horizontal flat portion. The flat portion has the opening, which is located on the lower side in an inclined direction of the main frames.

8 Claims, 9 Drawing Sheets

(56) References Cited

U.S. PATENT DOCUMENTS

| | | | | |
|---|---|---|---|---|
| 2013/0153319 A1* | 6/2013 | Kawano | ............ | B60K 15/03006 |
| | | | | 180/69.4 |
| 2014/0061203 A1* | 3/2014 | Yokomura | ............... | B62J 35/00 |
| | | | | 220/562 |
| 2015/0014078 A1* | 1/2015 | Sasaki | ..................... | B62J 35/00 |
| | | | | 180/219 |
| 2015/0090512 A1* | 4/2015 | Inoue | ....................... | B62J 35/00 |
| | | | | 180/219 |
| 2017/0057584 A1* | 3/2017 | Ozawa | .................... | B62J 35/00 |

FOREIGN PATENT DOCUMENTS

| | | | | |
|---|---|---|---|---|
| EP | 2679476 A1 * | 1/2014 | ............. | B62K 11/10 |
| EP | 2845788 A1 | 3/2015 | | |
| EP | 3072793 A1 * | 9/2016 | ............. | B62J 35/00 |
| JP | 08-034379 | 2/1996 | | |
| JP | 2007-224831 A | 9/2007 | | |
| JP | 2008-238904 A | 10/2008 | | |

* cited by examiner

FUEL TANK FOR STRADDLE TYPE VEHICLE

BACKGROUND OF THE INVENTION

Field of the Invention

The present invention relates to a fuel tank for a straddle type vehicle which is split into two upper and lower parts in the vertical direction.

Description of Related Art

There is disclosed a structure which includes a head pipe, a pair of left and right main frames extending rearwardly from the head pipe while being spaced apart from each other in the vehicle width direction, a cross member extending between the left and right main frames, and a fuel tank arranged in a space surrounded with the left and right main frames and the cross member, wherein the fuel tank is split into two upper and lower parts, and a mating surface between the upper and lower parts of the fuel tank is located in the vicinity of upper ends of the main frames (for example, see Japanese Patent Application Laid-Open Publication No. H08-34379).

In the fuel tank split in the vertical direction, a suitable arrangement of a fuel pump is desired when the fuel pump is arranged within the fuel tank.

SUMMARY OF THE INVENTION

It is therefore an object of the present invention to provide a fuel pump of a straddle type vehicle that is suitably arranged in a fuel tank.

In order to solve the above problem, according to the present invention, there is provided a fuel tank of a straddle type vehicle having a vertically split upper tank and lower tank that have mating portions joined by welding, the mating portions being arranged to extend along an upper part of left and right frame members, which are inclined so as to extend in a forward and rearward direction. A fuel pump being arranged in an interior of the fuel tank through an opening provided in the lower tank. A lid member is provided in the fuel pump so as to close the opening, wherein the lower tank is provided with a substantially horizontal bottom plate, and the bottom plate has the opening, which is located on a lower side in an inclined direction of the frame members.

In the above structure, the upper tank is provided with a downwardly extending wall that extends toward the mating portions on the lower side in the inclined direction. The fuel pump is arranged to extend upwardly in a vertical direction from the opening. An upper end of the fuel pump is located above the mating portions in a side view. A seat located in the rear of the downwardly extending wall is supported on an upper surface of the upper tank.

Further, in the above structure, the frame members have main frames, which extend downwardly to the rear while spreading left and right from the head pipe.

Further, in the above structure, the upper tank and the lower tank are cut out of a titanium plate member and molded by press-molding.

Further, in the above structure, the fuel tank is formed in substantially a rectangular shape in a side view, and the mating portions are arranged to extend from a front upper part to a rear lower part of the rectangular shape.

Further, in the above structure, the fuel tank has a filler cap, which is arranged in an upper part of the upper tank, and a convex portion, which is provided between the filler cap and the seat.

Since the lower tank of the present invention is provided with the substantially horizontal bottom plate, and the bottom plate has the opening which is located on the lower side in the inclined direction of the frame members, fuel around the fuel pump can be sucked in evenly by having the fuel pump arranged on the substantially horizontal bottom plate, and the fuel which is collected below the fuel pump can be reduced. Moreover, since the opening into which the fuel pump is fitted is located on the lower side in the inclined direction on which a distance between each of the mating portions and the substantially horizontal bottom plate gets closer, and the opening is covered with the lid member of the fuel pump having a heavy load, the fuel pump can be arranged close to the mating portions. Even if an excessive load has acted on the fuel tank when a vehicle jumps, for example, the mating portions easily receive the load, and the load acting on the mating portions can be decreased, so that the fuel pump can be arranged suitably within the fuel tank.

Further, the upper tank is provided with the downwardly extending wall, which extends toward the mating portions on the lower side in the inclined direction. The fuel pump is arranged to extend upwardly in the vertical direction from the opening. The upper end of the fuel pump is located above the mating portions in a side view. The seat located in the rear of the downwardly extending wall is supported on the upper surface of the upper tank. Therefore, a capacity of the fuel tank can be increased, and at the same time, the seat can be supported at a predetermined height.

Further, since the frame members include the main frames, which extend downwardly to the rear while spreading left and right from the head pipe. The fuel pump is configured to be arranged between the downwardly rearwardly inclined main frames and on the wider rear part sides of the left and right main frames, so that lateral walls of the fuel tank located close to the fuel pump can be prevented from interfering with the main frames.

Further, since the upper tank and the lower tank are cut out of a titanium plate member and molded by press-molding, a light titanium material is used for the fuel tank, which is located at a higher position than the frame members, so that weight can be reduced in an upper part of the vehicle body so as to be able to concentrate mass.

Further, since the fuel tank is formed in substantially a rectangular shape in a side view, and the mating portions are arranged to extend from the front upper part to the rear lower part of the rectangular shape, the weld length of the mating portions is made longer, and the load of the large capacity fuel tank, which is provided with the heavy fuel pump, can be supported by the frame members in a good condition.

Further, since the fuel tank has the filler cap, which is arranged in the upper part of the upper tank, and the convex portion, which is provided between the filler cap and the seat, a weight shift movement of the rider can be performed smoothly without being influenced by the projection of the filler cap.

BRIEF DESCRIPTION OF THE DRAWINGS

These and further features of the invention will be apparent with reference to the description and drawings, wherein.

DETAILED DESCRIPTION OF THE INVENTION

Figure 1:
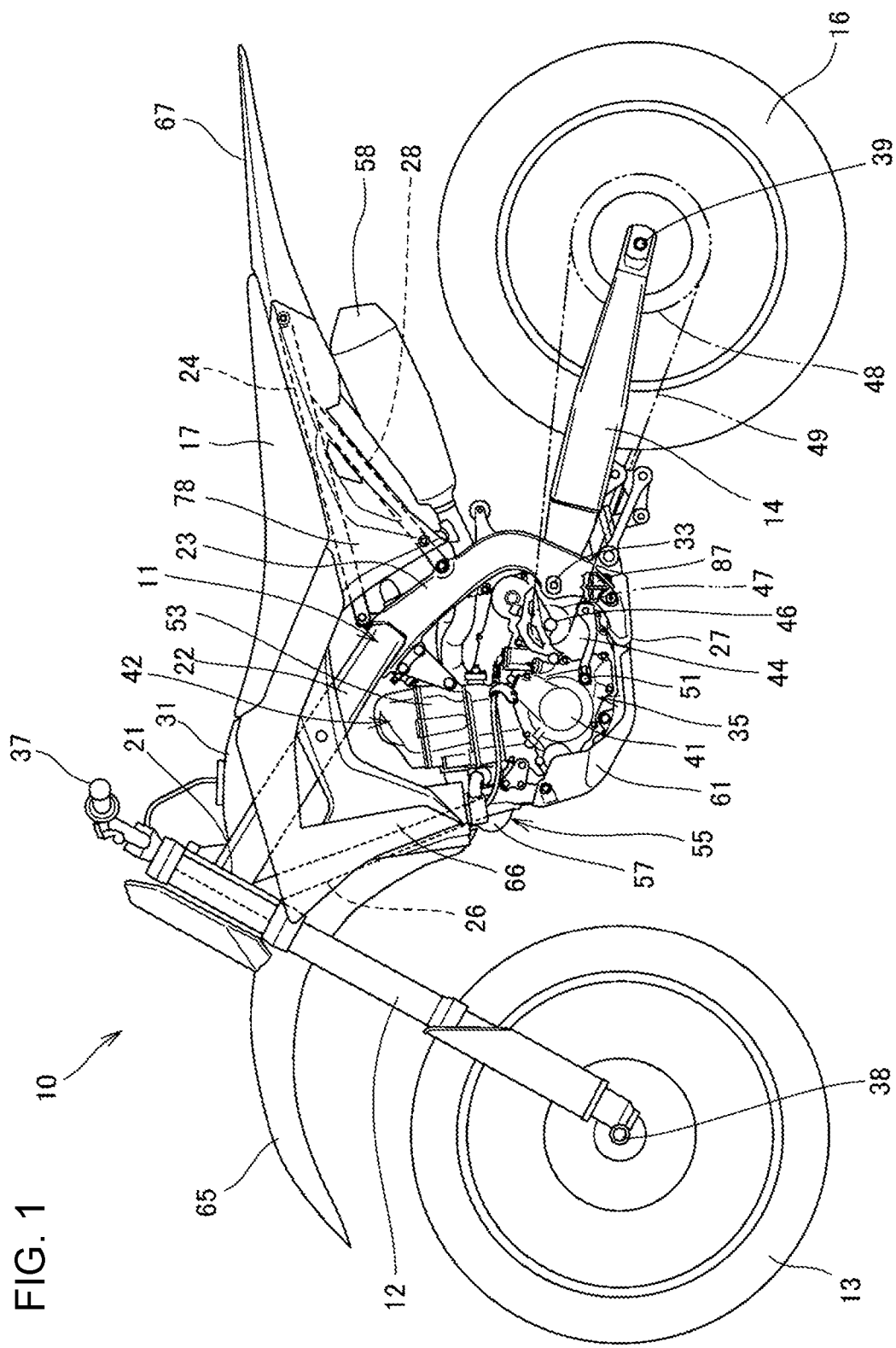
FIG. 1 is a left side view of a two-wheeled vehicle on which is mounted a fuel tank in accordance with a first embodiment of the present invention.

Hereinafter, embodiments of the present invention will be described with reference to accompanying drawings. In the description, the orientation such as "front", "rear", "left", "right", "top", "bottom" or the like shall be identical with the orientation of a vehicle body unless otherwise described. In addition, in the drawings, a reference character FR designates a front side of the vehicle body, a reference character UP designates an upper side of the vehicle body and a reference character LH designates a left side of the vehicle body.

FIG. 1 is a left side view showing a two-wheeled motorcycle 10 on which a fuel tank 31 in accordance with a first embodiment of the present invention is mounted.

The motorcycle 10 has a front wheel 13, which is supported on a front end portion of a vehicle body frame 11 through a front fork 12, a rear wheel 16, which is supported on a rear lower part of the vehicle body frame 11 through a swing arm 14, and a seat, which is supported on an upper part of the vehicle body frame 11. Like this, the motorcycle 10 is a straddle type vehicle on which a driver rides in a straddling fashion.

The vehicle body frame 11 includes a head pipe 21, left and right main frames 22, left and right center frames 23, left and right seat frames 24, a down frame 26, left and right lower frames 27, and left and right sub-frames 28.

The head pipe 21 constitutes the front end portion of the vehicle body frame 11 and supports the front fork 12 thereon in a steerable fashion. The left and right main frames 22 (see also FIG. 3) extend from an upper part of the head pipe 21 obliquely downwardly to the rear on the left and right sides such that a distance between the left and right main frames 22 is spaced apart from each other with approach toward the rear, and are configured to support thereon a seat 17 and a fuel tank 31 arranged in front of the seat 17. The center frames 23 extend from rear end portions of the main frames 22 obliquely downwardly to the rear and are curved substantially downwardly. A pivot shaft 33, which swingably supports a front end portion of the swing arm 14, extends between the left and right center frames 23.

The seat frames 24 extend from upper ends of the left and right center frames 23 obliquely upwardly to the rear so as to support the seat 17 on the upper sides thereof. The down frame 26 extends substantially downwardly from a lower part of the head pipe 12. The left and right lower frames 27 extend downwardly left and right from a lower end portion of the down frame 26 and then are directed toward the rear so as to be connected to lower end portions of the left and right center frames 23, respectively. The sub-frames 28 extend from the left and right center frames 23 obliquely upwardly to the rear, and each of rear end portions of the sub-frames 28 is connected to each of the left and right seat frames 24.

An engine 35 is supported by the left and right center frames 23, the down frame 26 and the left and right lower frames 27.

A bar handle 37 is supported on an upper end portion of the front fork 12 and the front wheel 13 is carried on a lower end portion of the front fork 12 through a front wheel axle 39.

The engine 35 includes a crankcase 41 and a cylinder section 42, which extends upwardly from a front upper part of the crankcase 41.

A transmission 44 is provided integral with a rear part of the crankcase 41. A drive sprocket 47 is mounted on an output shaft 46 of the transmission 44, and a chain 49 is bridged between and wrapped around the drive sprocket 47 and a driven sprocket 48, which is provided integral with the rear wheel 16. Moreover, the transmission 44 includes a gear change pedal 51, which is arranged on a left lateral side of a lower part of the crankcase 41 in order that the driver performs gear shift operation.

The cylinder section 42 includes a cylinder head 53. An intake device (not shown) is connected to a rear part of the cylinder head 53, and an exhaust device 55 is connected to a front part thereof. The exhaust device 55 includes an exhaust pipe 57 connected to the cylinder head 53, and a muffler 58 connected to a rear end portion of the exhaust pipe 57.

In a front lower part of the vehicle body there is arranged an engine guard 61, which covers the engine 35 and the left and right lower frames 27 from the front and from below.

By the way, in the drawing, a reference character 65 designates a front fender, which covers the front wheel 13 from above, 66 left and right shrouds, which covers from lateral sides the main frames 22 located on a front upper side of the vehicle body and the down frame 26, and 67 a rear fender, which covers the rear wheel 16 from above.

Figure 2:
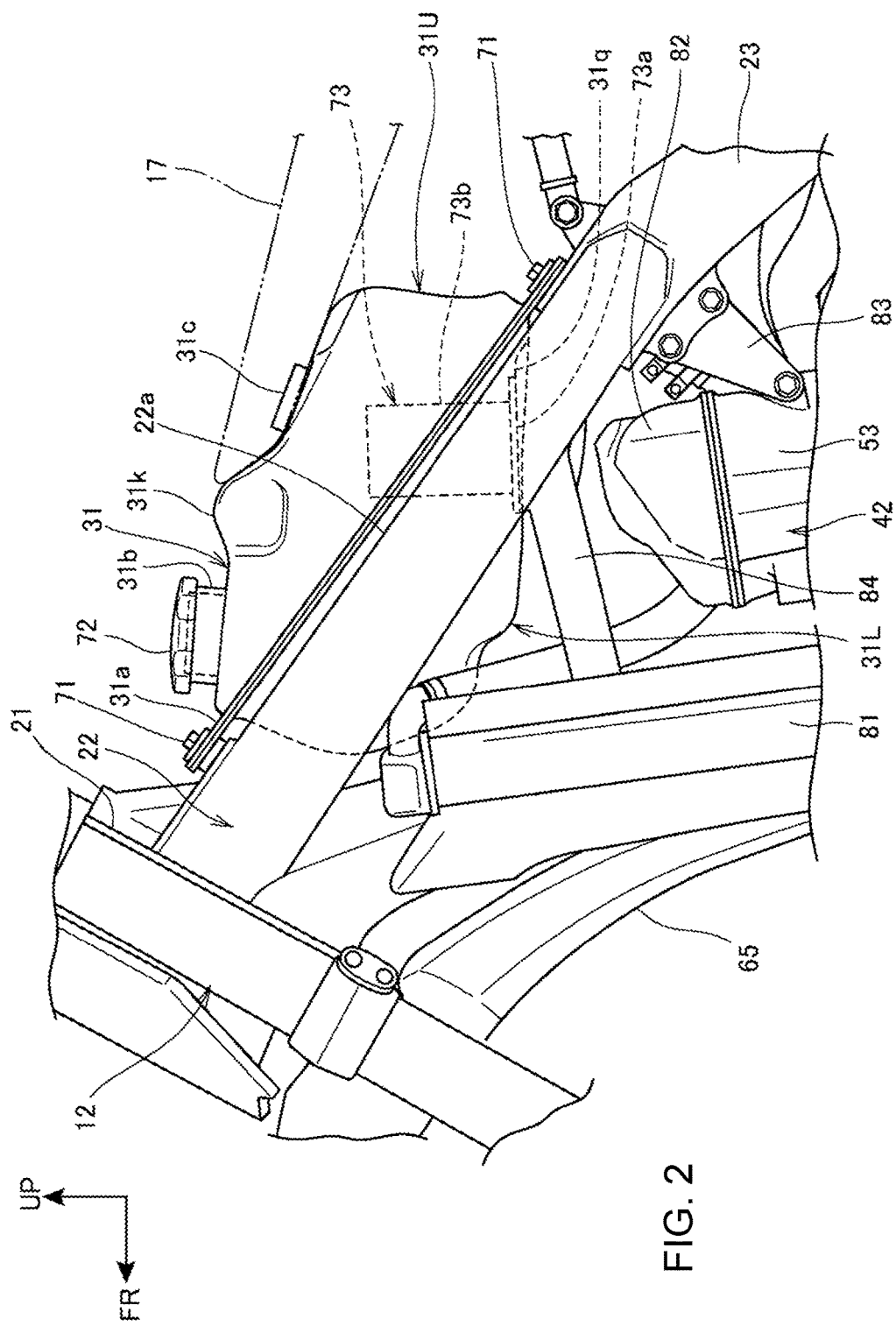
FIG. 2 is a left side view of the fuel tank and its environs.

FIG. 2 is a side view showing the fuel tank and its environs.

The fuel tank 31 is a receptacle of a substantially rectangular shape in a side view, and is formed by joining an upper tank 31U and a lower tank 31L in an upward and downward direction. In a position of one of diagonal lines (a downwardly rearwardly extending diagonal line that connects a front upper part and a rear lower part of the rectangular shape) of the rectangular shape, there are provided flanges 31a that form mating portions between the upper tank 31U and the lower tank 31L. A front end portion and a rear end portion of each of the flanges 31a are elastically supported on and fixedly secured to the left and right main frames 22 or the surrounding members of the main frames 22 through an elastic member (rubber). Hereinafter, the main frames 22 on which the flanges 31a are elastically supported, or the surrounding members of the main frames 22 on which the flanges 31a are elastically supported are referred to as the main frame 22 side.

A reference character 71 designates bolts for fastening the flanges 31a to the main frames 22 through elastic members.

An upper surface 22a of the main frame 22 is formed as a rearwardly downwardly extending flat surface, and the flanges 31a are arranged spaced apart from the upper surface 22a and extend in parallel with the upper surface 22a.

The upper tank 31U has a filler opening 31b, which projects upwardly from the front upper part of the upper tank 31U, and a seat engaging portion 31c formed at a rear upper part of the upper tank 31U so as to be engaged with a front end bottom portion of the seat 17 to support the seat 17. The filler opening 31b is closed by a filler cap 72.

The lower tank 31L has a bottom front part that projects downwardly below the main frame 22 and a bottom rear part on which a fuel pump 73 is fixed. A pump main body section 73*b* (see FIG. 4) of the fuel pump 73 is built in the fuel tank 31.

In the drawing, a reference character 81 designates radiators, which are arranged on both left and right sides of the down frame 26, 82 designates a head cover for covering an upper opening of the cylinder head 53, 83 designates an engine hanger, which is mounted on an upper end portion of the center frame 23 so as to support the cylinder section 42 thereon, and 84 designates left and right reinforcing frames, which provide a connection between the main frame 22 and the down frame 26.

Figure 3:
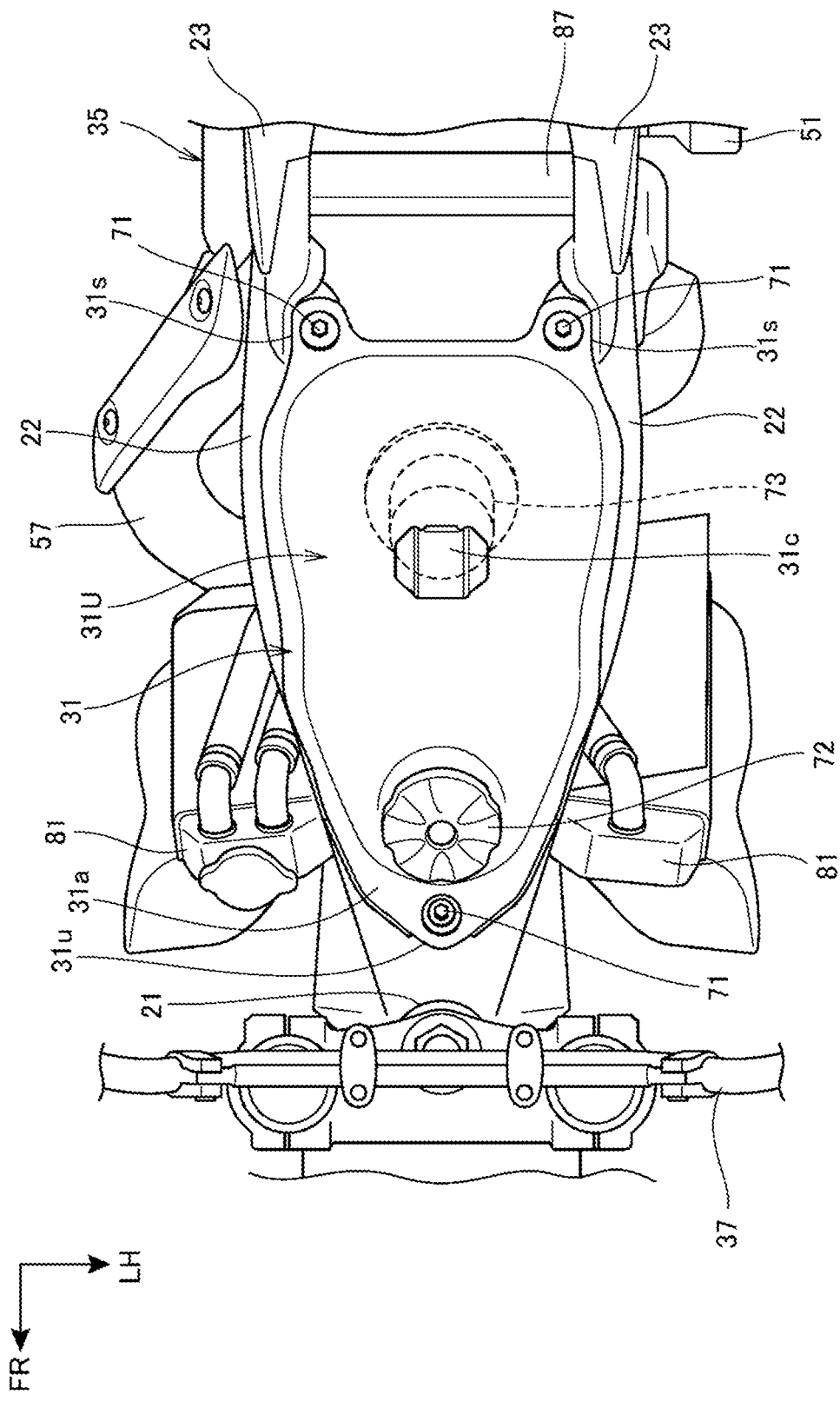
FIG. 3 is a view of the fuel tank and its environs as seen from an upper side in the axial direction of a head pipe.

FIG. 3 is a view showing the fuel tank 31 and its environs as seen from an upper side in the axial direction of the head pipe 21.

The left and right main frames 22, 22 spread laterally in the obliquely rearward direction from the head pipe 21 and extend rearwardly respectively with approach toward rear end portions thereof. Herein, a reference character 87 designates a cross frame for connecting the left and right center frames 23, 23, which extends in the vehicle width direction.

Each of the upper tank 31U and the lower tank 31L of the fuel tank 31 (see FIG. 2) has a side view shape extending along the main frame 22, and the lower tank 31L is interposed between the left and right main frames 22, 22.

Each of the flanges 31*a* has a front end, which is fixed in a middle position in the vehicle width direction, and a rear end, which is fixed in two positions spaced apart from each other in the vehicle width direction.

The fuel pump 73 is provided in the widest portion in the vehicle width direction of a rear part of the lower tank 31L.

Figure 4:
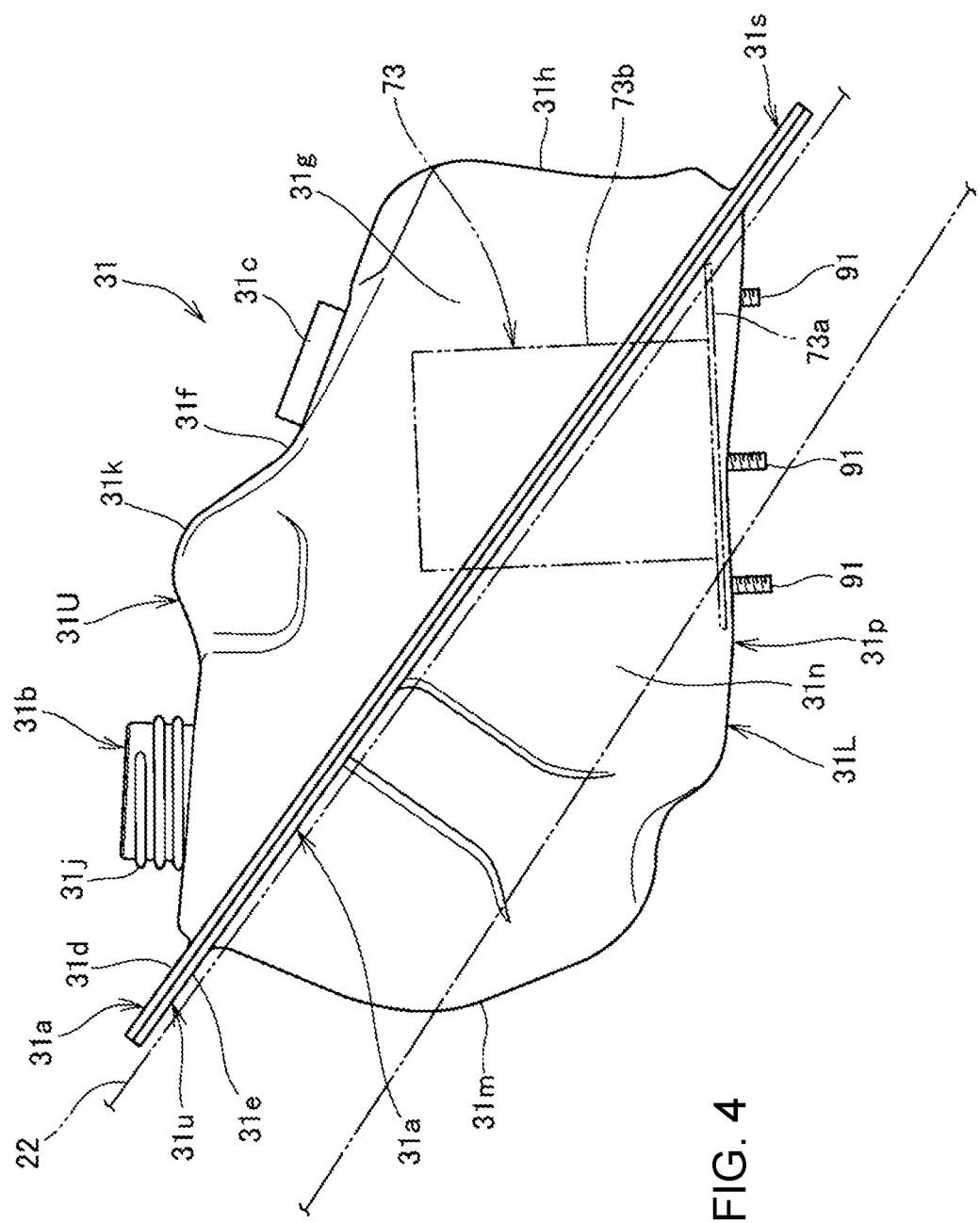
FIG. 4 is a left side view of the fuel tank.

FIG. 4 is a left side view of the fuel tank 31. Herein, the flanges 31*a* of the fuel tank 31 are depicted in such a way as to enlarge its thickness in order for easily grasping its shape.

With respect to the fuel tank 31, an annular upper flange portion 31*d*, which is formed in a flat plate shape at a lower end of the upper tank 31U, and an annular lower flange portion 31*e*, which is formed in a flat plate shape at an upper end of the lower tank 31L, are joined together by electric resistance welding (seam welding). The upper flange portion 31*d* and the lower flange portion 31*e* constitute the flanges 31*a*.

The upper tank 31U and the lower tank 31L are molded by press-molding from blank materials of titanium, which are cut into flat plates.

The fuel tank 31 is formed in a rectangular shape in a side view, and each of the flanges 31*a* is formed in such a way as to extend substantially along the downwardly rearwardly extending diagonal line which is one of diagonal lines of the rectangle. Namely, the upper tank 31U and the lower tank 31L are formed such that one of these tanks overlaps with the other when the one is rotated 180°. Accordingly, the blank materials before press-molding the upper tank 31U and the lower tank 31L can be formed in the same shape, and costs can be reduced by sharing the blank materials of the same shape.

The upper tank 31U includes an upper wall 31*f*, left and right lateral walls 31*g*, and a rear wall 31*h*.

The upper wall 31*f* is integrally formed with the filler opening 31*b* of cylindrical shape in which a male screw portion 31*j* is formed, and an upwardly projecting convex portion 31*k* formed in the rear of the filler opening 31*b* and in front of the seat engaging portion 31*c*. The convex portion 31*k*, as shown in FIG. 2, is located forwardly of the seat 17 and formed substantially at the same level with a height of a front end portion of the seat 17. Therefore, when the driver has moved forwardly of a front end of the seat 17, the driver can smoothly get over the filler opening 31*b* on which the filler cap 72 is mounted, in the forward direction.

Referring again to FIG. 4, the rear wall 31*h* extends substantially vertically upward from the upper flange 31*d*.

The lower tank 31L includes a front wall 31*m*, left and right lateral walls 31*n*, and a bottom wall 31*p*. The front wall 31*m* extends substantially vertically downward from the lower flange 31*e*. The bottom wall 31*p* has a rear part formed substantially horizontally, and the fuel pump 73 is mounted on the substantially horizontal rear part.

The fuel pump 73 includes a pump flange section 73*a*, which is mounted on the bottom wall 31*p* of the lower tank 31L, and a pump main body section 73*b*, which extends upwardly from the pump flange section 73*a*.

The pump main body section 73*b* includes a motor for generating motive power, a filter for filtrating the fuel, and others.

Figure 5:
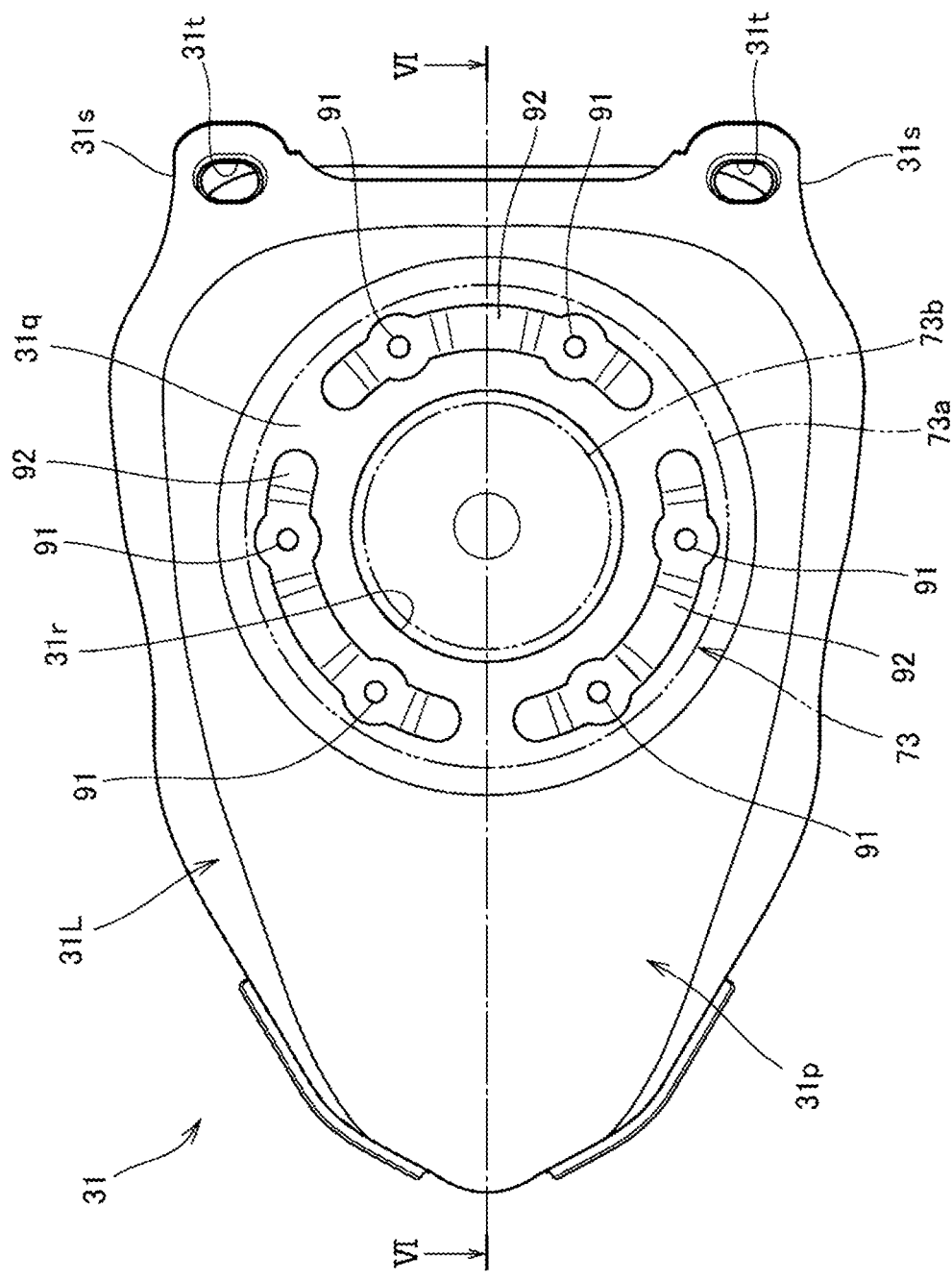
FIG. 5 is a bottom view of the fuel tank.

FIG. 5 is a bottom view of the fuel tank 31.

The lower tank 31L of the fuel tank 31 is formed with a substantially horizontal flat portion 31*q* of a circular shape in the rear part of the bottom wall 31*p*. The flat portion 31*q* is a portion that is located in an inward side of the fuel tank 31 from a circumference thereof, and a circular opening 31*r* into which the pump main body section 73*b* of the fuel pump 73 is inserted is formed in a middle of the flat portion 31*q*. Moreover, to the flat portion 31*q* located in a circumference of the opening 31*r* there are joined a plurality of bolt supporting members 92 of circular arc shape each of which is provided with a plurality of stud bolts 91 for fastening the pump flange section 73*a* of the fuel pump 73. The stud bolts 91 are fitted into bolt insertion holes (not shown) provided on the pump flange section 73*a*, and nuts are screw-threaded into and fastened to distal ends of the stud bolts 91, so that the fuel pump 73 is fixedly secured to the lower tank 31L.

In the drawing, a reference characters 31*s* designates a tank rear part fixing section formed in the rear end portion of the flanges 31*a* in order for mounting the fuel tank 31 on the main frame 22 side (see FIGS. 1), and 31*t* designates a bolt insertion hole into which a bolt for mounting the tank rear part fixing section 31*s* is inserted. By the way, a tank front part fixing section 31*u* (see FIG. 3) for mounting the front end portions of the flanges 31*a* on the main frame 22 side is invisible in a bottom view since it overlaps with a front part of the lower tank 31L.

Figure 6:
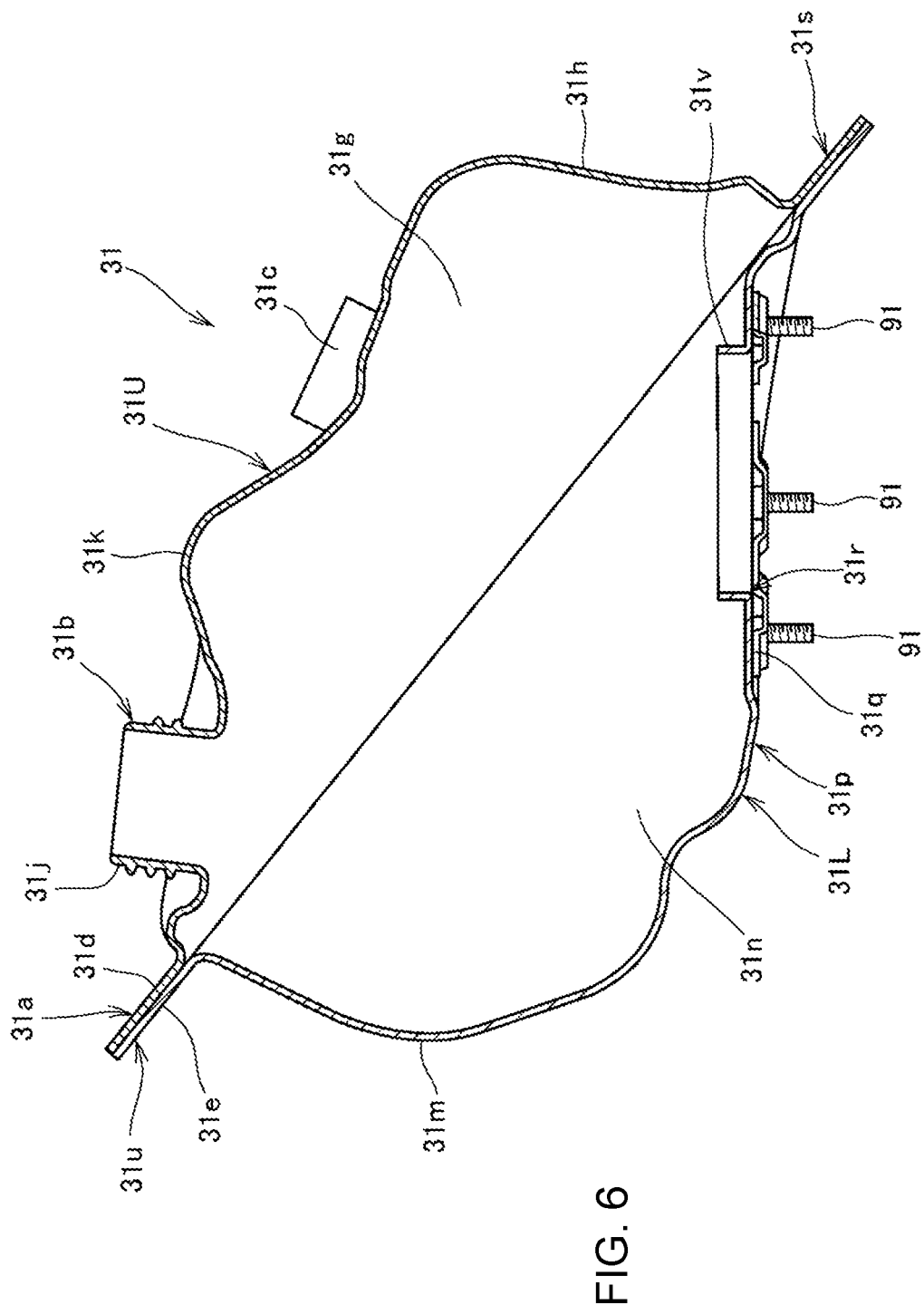
FIG. 6 is a cross sectional view taken on line VI-VI of FIG. 5.
Figure 7:
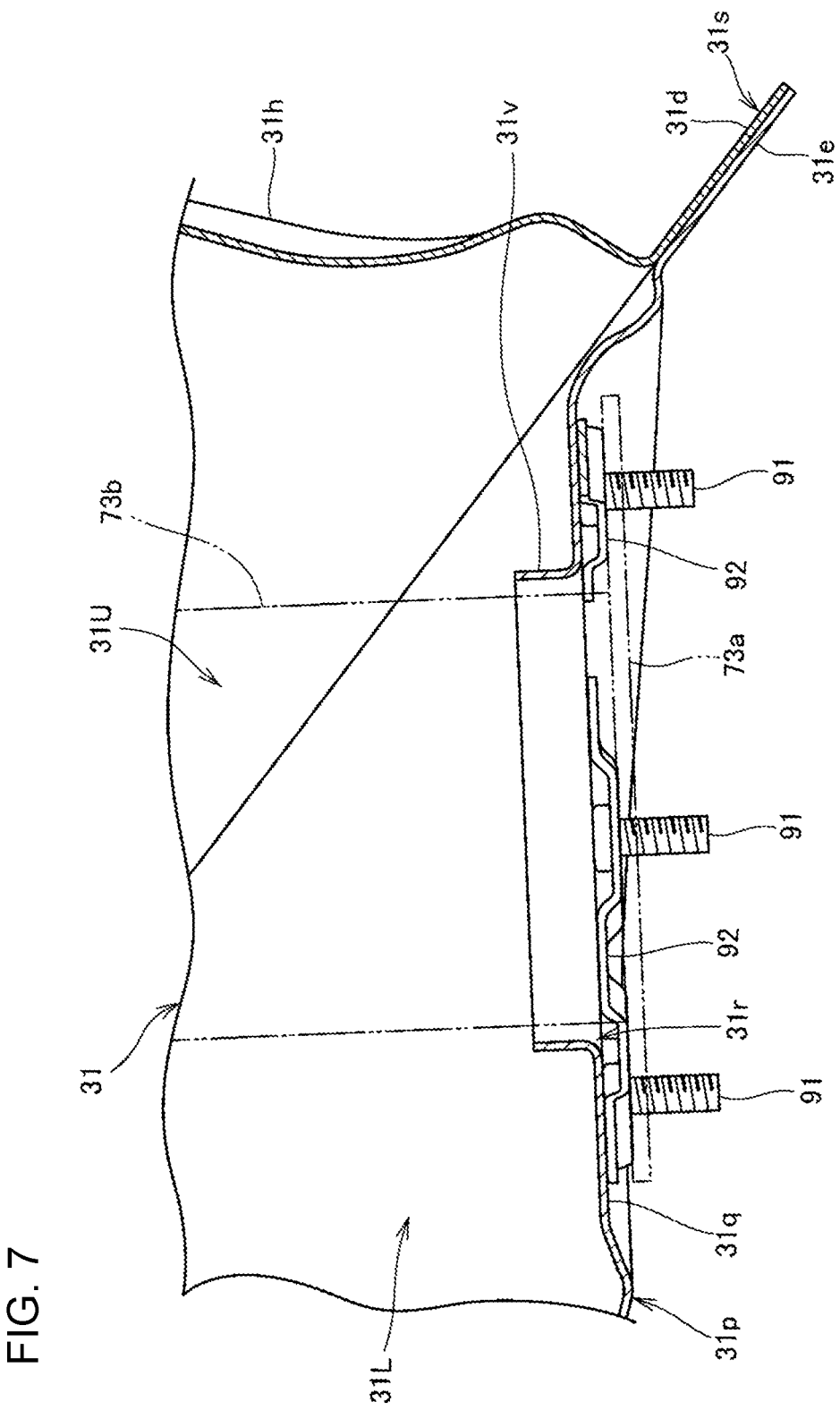
FIG. 7 is an enlarged view of an essential part of FIG. 6.

FIG. 6 is a cross sectional view taken on line VI-VI of FIG. 5. FIG. 7 is an enlarged view of an essential part of FIG. 6.

As shown in FIGS. 6 and 7, the opening 31*r* provided in the flat portion 31*q* of the lower tank 31L is formed by an annular wall portion 31*v* formed integral with the flat portion 31*q*. Like this, since the opening 31*r* is not a simple opening and is formed by the annular wall portion 31*v*, the annular wall portion 31*v* serves as a reinforcing rib so that the opening 31*r* can be reinforced.

The flat portion 31*q* is formed in a higher position than a circumferential part thereof. With this structure, since lower end positions of the stud bolts 91 provided on the flat portion 31*q* are able to be located in a higher position, the engine 35 (see FIG. 1) located below the fuel tank 31 can be located in a higher position. As a result, a minimum ground clearance of the engine 35 can be heightened. At the same time, since the circumferential part of the flat portion 31*q* is lowered, it is possible to ensure a capacity of the fuel tank 31.

Figure 8:
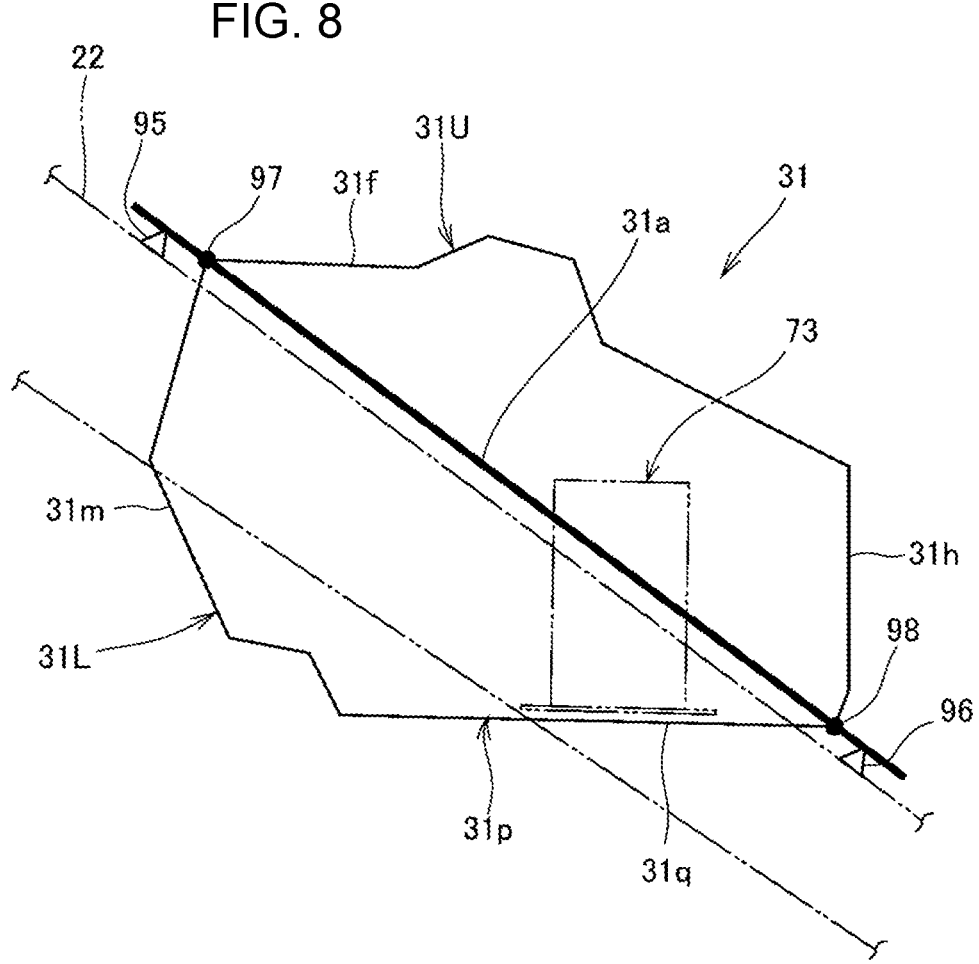
FIG. 8 is a left side view schematically showing the fuel tank together with a main frame.

FIG. 8 is a left side view schematically showing the fuel tank 31 together with the main frame 22. Triangular marks in the drawings are fuel tank support portions 95, 96 on the side of vehicle body frame 11 and correspond to the bolts 71 (see FIG. 2) for fastening the flanges 31a.

The upper tank 31U has the rear wall 31h, which extends substantially vertically toward the flanges 31a, and the lower tank 31L has the front wall 31m, which extends substantially vertically toward the flanges 31a.

When the vehicle has made a landing after jumping, for example, a load due to the weight of the fuel and the fuel pump 73 within the fuel tank 31 and the acceleration at the time of landing acts downward on the lower tank 31L. A part of this load acts on the front wall 31m of the lower tank 31L as tensile force. For example, if the front wall 31m is inclined with respect to a vertical plane, bending force acting on the front wall 31m is increased whereby deformation or the like is produced. As compared with this, the substantially vertical front wall 31m is able to support the load so as to suppress the deformation or the like.

Further, although the downward load acting on the fuel pump 73 has a moment around the fuel tank support portion 96 generated in the fuel tank 31, the moment can be made smaller since the fuel pump 73 is arranged in the vicinity of the fuel tank support portion 96 located on the lower side in the inclined direction of the flanges 31a. Namely, the load acting on the flanges 31a may be decreased.

In addition, in a side view, a joining portion 97 (a portion shown by a black dot) between the flange 31a and the upper wall 31f of the upper tank 31U corresponds substantially to a joining portion between the flange 31a and the front wall 31m of the lower tank 31L. Similarly, in a side view, a joining portion 98 (a portion shown by a black dot) between the flange 31a and the rear wall 31h of the upper tank 31U corresponds substantially to the flange 31a and the bottom wall 31p of the lower tank 31L. With provision of the substantially corresponding joining portions 97, 98 between the upper tank 31U and the lower tank 31L in this manner, each of blank materials for the upper tank 31U and the lower tank 31L can be formed in the same shape. Accordingly, in comparison with the case where the blank material for the upper tank 31U is different from the blank material for the lower tanks 31L, a useless part can be lessened and costs can be reduced.

As shown in FIGS. 2, 4, 5 and 7, the fuel tank 31 of the straddle type vehicle includes the vertically split upper tank 31U and lower tank 31L, which have the flanges 31a as the mating portions joined by welding. The flanges 31a are arranged to extend along the upper parts of the main frames 22 as the left and right frame members, which are inclined so as to extend in the forward and rearward direction. The fuel pump 73 is arranged in the interior of the fuel tank 31 through the opening 31r provided in the lower tank 13L, and the pump flange section 73a as the lid member is provided in the fuel pump 73 so as to close the opening 31r. The lower tank 31L is provided with the bottom wall 31p formed as a substantially horizontal bottom plate, and the bottom wall 31p has the opening 31r, which is located on the lower side in the inclined direction of the main frames 22.

With the above structure, since the fuel pump 73 is arranged on the substantially horizontal bottom plate 31p (in detail, the flat portion 31q), the fuel around the fuel pump 73 can be sucked or drawn in evenly and the fuel collected below the fuel pump 73 can be reduced. Moreover, since the opening 31r into which the fuel pump 73 is fitted is located on the lower side in the inclined direction on which a distance between each of the flanges 31a and the substantially horizontal flat portion 31q gets closer, and the opening 31r is covered with the pump flange section 73a of the fuel pump 73 having a heavy load, the fuel pump 73 can be arranged close to the flanges 31a. Therefore, even if an excessive load has acted on the fuel tank 31 when the vehicle jumps, for example, the flanges 31a easily receive the load, and the load acting on the flanges 31a can be decreased, so that the fuel pump 73 can be arranged suitably within the fuel tank 31.

Further, as shown in FIGS. 2, 4 and 6, the upper tank 31U is provided with the rear wall 31h formed as a downwardly extending wall, which extends toward the flanges 31a on the lower side in the inclined direction. The fuel pump 73 is arranged to extend upwardly in the vertical direction from the opening 31r. The upper end of the fuel pump 73 is located above the flanges 31a in a side view. The seat 17 located in the rear of the rear wall 31h is supported on the upper surface of the upper tank 31U. Therefore, the capacity of the fuel tank 31 can be increased, and at the same time the seat 17 can be supported at a predetermined height.

Further, as shown in FIGS. 2 and 3, since the frame members comprise the main frames 22, which extend downwardly to the rear while spreading left and right from the head pipe 21, the fuel pump 73 is configured to be arranged between the downwardly rearwardly inclined main frames 22 and on the wider rear part sides of the left and right main frames 22, so that the lateral walls 31g, 31n (see FIG. 4) of the fuel tank 31 located close to the fuel pump 73 can be prevented from interfering with the main frames 22.

Further, the upper tank 31U and the lower tank 31L are molded by press-molding from the blank materials, which are cut into the titanium plate members. Thus, the light titanium material is used for the fuel tank 31 located at a higher position than the main frames 22, whereby the weight in the upper part of the vehicle body can be reduced and the mass of the vehicle body can be concentrated.

Further, as shown in FIG. 4, since the fuel tank 31 is formed in substantially a rectangular shape in a side view, and the flanges 31a are arranged to extend from the front upper part to the rear lower part of the rectangular shape, the weld lengths of the flanges 31a are made longer, and the load of the large capacity fuel tank 31, which is provided with the heavy fuel pump 73, can be supported by the main frames 22 in a good condition.

Further, as shown in FIG. 2, since the fuel tank 31 has the filler cap 72, which is arranged in the upper part of the upper tank 31U, and the convex portion 31k, which is provided between the filler cap 72 and the seat 17, a weight shift movement of the rider can be performed smoothly without being influenced by the projection of the filler opening 31b and the filler cap 72.

Figure 9:
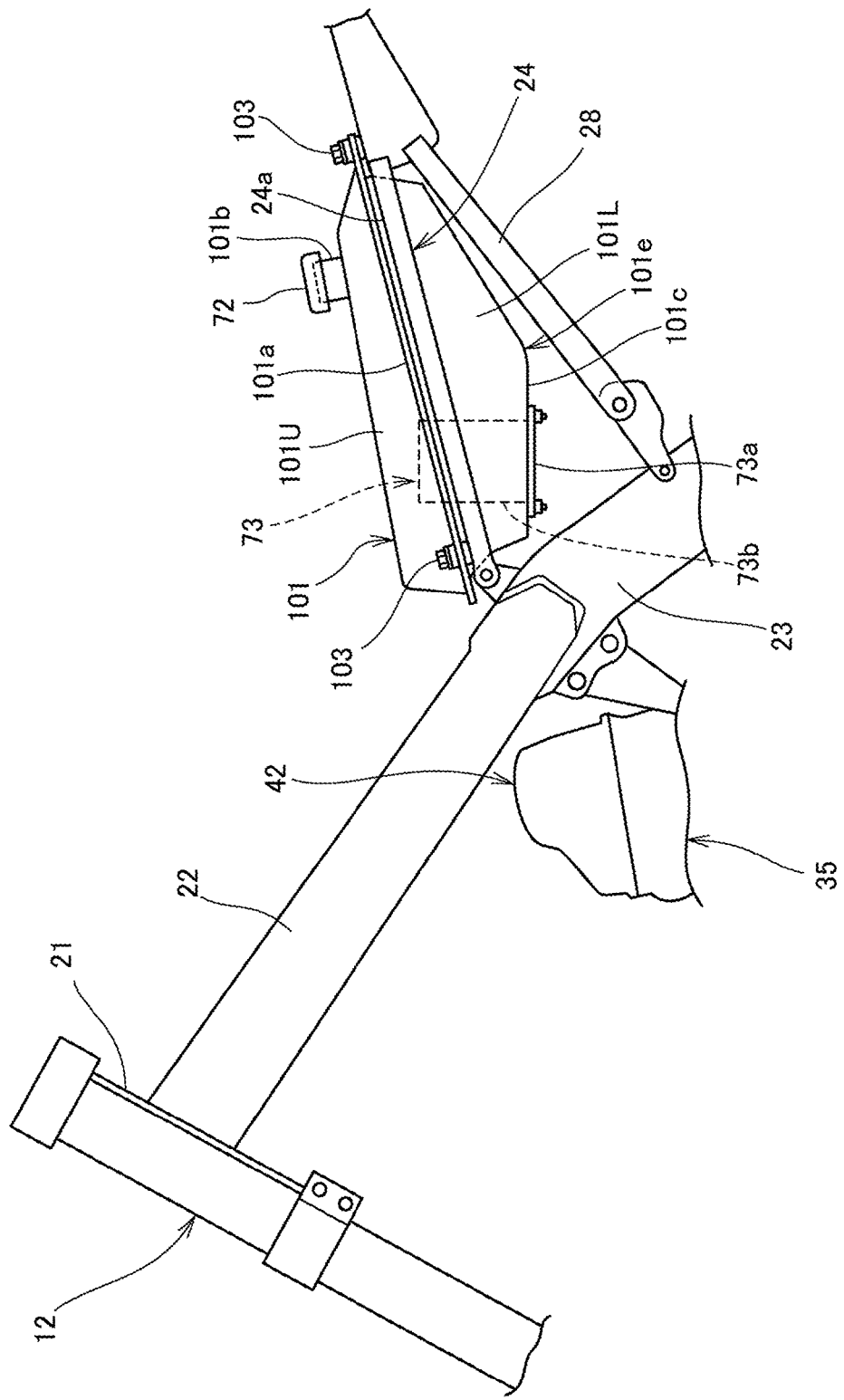
FIG. 9 is a left side view of the fuel tank and its environs in accordance with a second embodiment.

FIG. 9 is a left side view showing a fuel tank 101 and its environs in accordance with a second embodiment. Like elements are given like reference characters with respect to the structure corresponding to the first embodiment as shown in FIGS. 1 and 2, and the detailed explanation will be omitted.

The fuel tank 101 is a receptacle formed of an upper tank 101U and a lower tank 101L, which are vertically combined together. Flanges 101a, which are mating portions between the upper tank 101U and the lower tank 101L by seam welding, have a front part and a rear end portion thereof which are elastically supported through elastic members (rubbers) on left and right rearwardly upwardly inclined seat frames 24. Reference characters 103 designate bolts for fastening the flanges 101a to the seat frames 24 through the elastic members.

An upper surface 24a of the seat frame 24 is formed as a rearwardly upwardly extending plane surface. The flanges 101a are arranged spaced apart from the upper surfaces 24a in the upward direction and extend substantially parallel to the upper surfaces 24a.

The upper tank 101U and the lower tank 101L are molded by press-molding from blank materials which are cut into titanium flat plates.

The upper tank 101U is provided with an upwardly projecting filler opening 101 b in a rear upper part thereof. The filler opening 101b is covered with a filler cap 72. The lower tank 101L is formed with a substantially horizontal flat portion 101c in a front bottom part thereof. An opening (not shown) is formed in the flat portion 101c. The pump main body section 73b of the fuel pump 73 is inserted into the opening, and the pump flange section 73a of the fuel pump 73 is securely fixed to the flat portion 101c. The pump main body section 73b of the fuel pump 73 is accommodated in the fuel tank 101.

Namely, the lower tank 31L has a bottom wall 101e provided with the substantially horizontal flat portion 101c. In the flat portion 101c, there is formed the opening that is located on the lower side in the inclined direction of the seat frames 24.

It is to be understood that the above described embodiments are to be taken as a preferred form of the invention and that various changes and modifications may be made in the invention without departing from the spirit and scope thereof.

The present invention may be applied to the straddle type vehicles other than the two-wheeled motorcycle 10 without limiting to the application to the two-wheeled motorcycle 10.

DESCRIPTION OF REFERENCE CHARACTERS

10: Two-wheeled motorcycle, 17: Seat, 21: Head pipe, 22: Main frame (Frame member), 31: Fuel tank, 31a: Flange (Mating portion), 31h: Rear wall (Downwardly extending wall), 31L: Lower tank, 31p: Bottom wall (Bottom plate), 31r: Opening, 31U: Upper tank, 72: Filler cap, 73: Fuel pump, 73a: Pump flange section (Lid member)

What is claimed is:

1. A fuel tank of a straddle vehicle, comprising:
a vertically split upper tank and lower tank, said upper and lower tanks having mating portions joined by welding, the mating portions supported on left and right frame members, said left and right frame members comprise left and right main frames that extend from a head pipe obliquely downwardly and rearward while spreading left and right from the head pipe, the mating portions supported on the left and right main frames and arranged to extend downwardly and rearward along upper parts of the left and right main frames;
a fuel pump being arranged in an interior of the fuel tank through an opening provided in the lower tank; and
a lid member being provided in the fuel pump so as to close the opening;
wherein the lower tank is provided with a substantially horizontal bottom plate, and the bottom plate defines the opening, which is located on a lower side in an inclined direction of the left and right main frames,
wherein the upper tank and the lower tank are cut out of a plate member consisting essentially of titanium and molded by press-molding.

2. The fuel tank of a straddle vehicle according to claim 1, wherein the upper tank is provided with a downwardly extending wall that extends toward the mating portions on the lower side in the inclined direction, and the fuel pump is arranged to extend upwardly in a vertical direction from the opening, and wherein an upper end of the fuel pump is located above the mating portions in a side view, and a seat located rearwardly of the downwardly extending wall includes a front end portion supported on an upper surface of the upper tank.

3. The fuel tank of a straddle vehicle according to claim 2, wherein the fuel tank is formed in substantially a rectangular shape in a side view, and the mating portions are arranged to extend from a front upper part to a rear lower part of the rectangular shape.

4. The fuel tank of a straddle vehicle according to claim 2, wherein the fuel tank has a filler cap which is arranged in an upper part of the upper tank, and a convex portion which is provided between the filler cap and the front end portion of the seat, the convex portion is formed substantially at a same level with a height of the front end portion of the seat.

5. The fuel tank of a straddle vehicle according to claim 1, wherein the fuel tank is formed in substantially a rectangular shape in a side view, and the mating portions are arranged to extend from a front upper part to a rear lower part of the rectangular shape.

6. The fuel tank of a straddle vehicle according to claim 5, wherein the fuel tank has a filler cap which is arranged in an upper part of the upper tank, and a convex portion which is provided between the filler cap and a front end portion of a seat.

7. The fuel tank of a straddle vehicle according to claim 1, wherein the fuel tank is formed in substantially a rectangular shape in a side view, and the mating portions are arranged to extend from a front upper part to a rear lower part of the rectangular shape, and the upper tank and the lower tank are formed such that one of the upper tank and lower tank overlaps with the other of the upper tank and lower tank when the one tank is rotated 180 degrees.

8. The fuel tank of a straddle vehicle according to claim 1, wherein the fuel tank has a filler cap which is arranged in an upper part of the upper tank, and a convex portion which is provided between the filler cap and a front end portion of a seat.

* * * * *